United States Patent
Rice

[11] 3,889,814
[45] June 17, 1975

[54] COT STORAGE CART

[76] Inventor: Joseph Albert Rice, 8262 Tulane, University City, Mo. 63132

[22] Filed: Nov. 28, 1973

[21] Appl. No.: 419,820

[52] U.S. Cl. ............. 211/27; 211/49 S; 280/47.35; 280/79.3; 296/3
[51] Int. Cl. ............................................. A47f 7/00
[58] Field of Search ........... 211/22, 23, 60 T, 24, 4, 211/60 A, 5, 27, 28, 41, 49 R, 49 S; 280/47.34, 47.35, 79.1, 79.3, 33.99 T; 296/3; 108/55

[56] References Cited
UNITED STATES PATENTS

| | | | |
|---|---|---|---|
| 860,644 | 7/1907 | De Voy | 296/3 |
| 1,912,864 | 6/1933 | Stannard | 211/27 |
| 2,338,290 | 1/1944 | McDonald | 211/41 |
| 2,419,422 | 4/1947 | Schulein | 280/47.34 X |
| 2,572,355 | 10/1951 | Kintz | 211/41 |
| 2,621,815 | 12/1952 | Gannon | 211/27 X |
| 2,945,699 | 7/1960 | Berlye | 211/27 X |
| 2,947,565 | 8/1960 | Wood | 108/55 X |
| 3,689,098 | 9/1972 | Rubin | 280/33.99 T |
| 3,712,638 | 1/1973 | Lipinsky | 280/79.1 |
| 3,786,928 | 1/1974 | Johnson | 211/22 X |

FOREIGN PATENTS OR APPLICATIONS

| | | | |
|---|---|---|---|
| 1,909,391 | 9/1969 | Germany | 280/79.1 |
| 98,549 | 4/1964 | Denmark | 280/79.1 |

Primary Examiner—Marion Parsons, Jr.
Assistant Examiner—Thomas J. Holko
Attorney, Agent, or Firm—Lionel L. Lucchesi

[57] ABSTRACT

A cot storage cart is provided that permits easy handling and storage for a plurality of sleeping cots. The cart includes means for locking the cots within the cart structure during storage. Cot storage capability is maximized while the space required for cot storage is minimized. Individual ones of the cot plurality are separated from adjoining cots. This separation permits the cots to be cleaned without necessitating their removal from the cart structure.

9 Claims, 3 Drawing Figures

FIG. I.

COT STORAGE CART

BACKGROUND OF THE INVENTION

This invention relates to special purpose storage and conveyance vehicles, and more particular to a storage and transporting vehicle for sleeping cots.

The acceptance of the working mother in American society has resulted in a proliferation of child day care centers. In general, the usual day care center attempts to model itself, in many respects, after the more conventional lower grades of the established school system. That is, day care centers usually have a predetermined curriculum and schedule which is designed, by the daily routine to keep the children entertained and informed. Ideally, they also prepare the child for school attendance. It is common, particularly with the young children conventionally enrolled in day care centers, to include at least one rest period in the daily routine. Individual personal cots are provided for this purpose. These cots conventionally are aluminum tubular frame devices having a nylon web bed attached to the frame members. While this cot construction is extremely light, the cots are unwiedly because the frame includes legs which supports the bed portion above the floor. In addition, a relatively large number of cots must be available for use during the rest period. However, the cots must be stored unobstrusively when not in use. The transition from storage to use, and the return to storage, can be one of the more tumultuous periods in the day care center schedule.

The prior art reveals many known conveyance designs, both general purpose and special purpose, which are intended to transport and/or store a variety of different objects. While these prior art devices work well for their intended purposes, they have not recognized the special problems presented with sleeping cot storage and use. Thus, for example, the multi-leg design of the conventional sleeping cot prohibits the use of many prior art devices because those devices cannot accommodate the legs of the cot. Likewise, even when usable for transporting sleeping cots between various locations, prior art devices are not designed to permit acceptable storage for the cot.

Because the cots may be used by several children over periods of time, the cots must be cleaned periodically. Prior art designs, in general, require cot removal from the conveyance for cleaning. This is an inconvenience eliminated by the cart of this invention. The cart of this invention also includes simple locking means for securing a cot plurality within the device.

One of the objects of this invention is to provide a low cost transporting means for a plurality of sleeping cots.

Another object of this invention is to provide a cot transporting means which also functions as a storage cart.

Another object of this invention is to provide a cot storage cart having a first loading end and a second unloading end.

A further object of this invention is to provide a cot storage cart which permits the cleaning of each sleeping cot without necessitating cot removal from the cart.

Other objects will be apparent to those skilled in the art in light of the following description and accompanying drawings.

SUMMARY OF THE INVENTION

In accordance with this invention, generally stated, a transporting and storage device is provided which is specially adapted for use with sleeping cots. The preferred embodiment carries a predetermined number of sleeping cots in spaced, parallel relationship. The device is arranged so that the cots are loaded sequentially from a first end of the device and unloaded in reverse order. Means are provided for preventing cot leg interference during loading and unloading. The device includes removably mounted locking means for fixing cot position in the device.

DESCRIPTION OF THE PREFERRED EMBODIMENT

Figure 1:
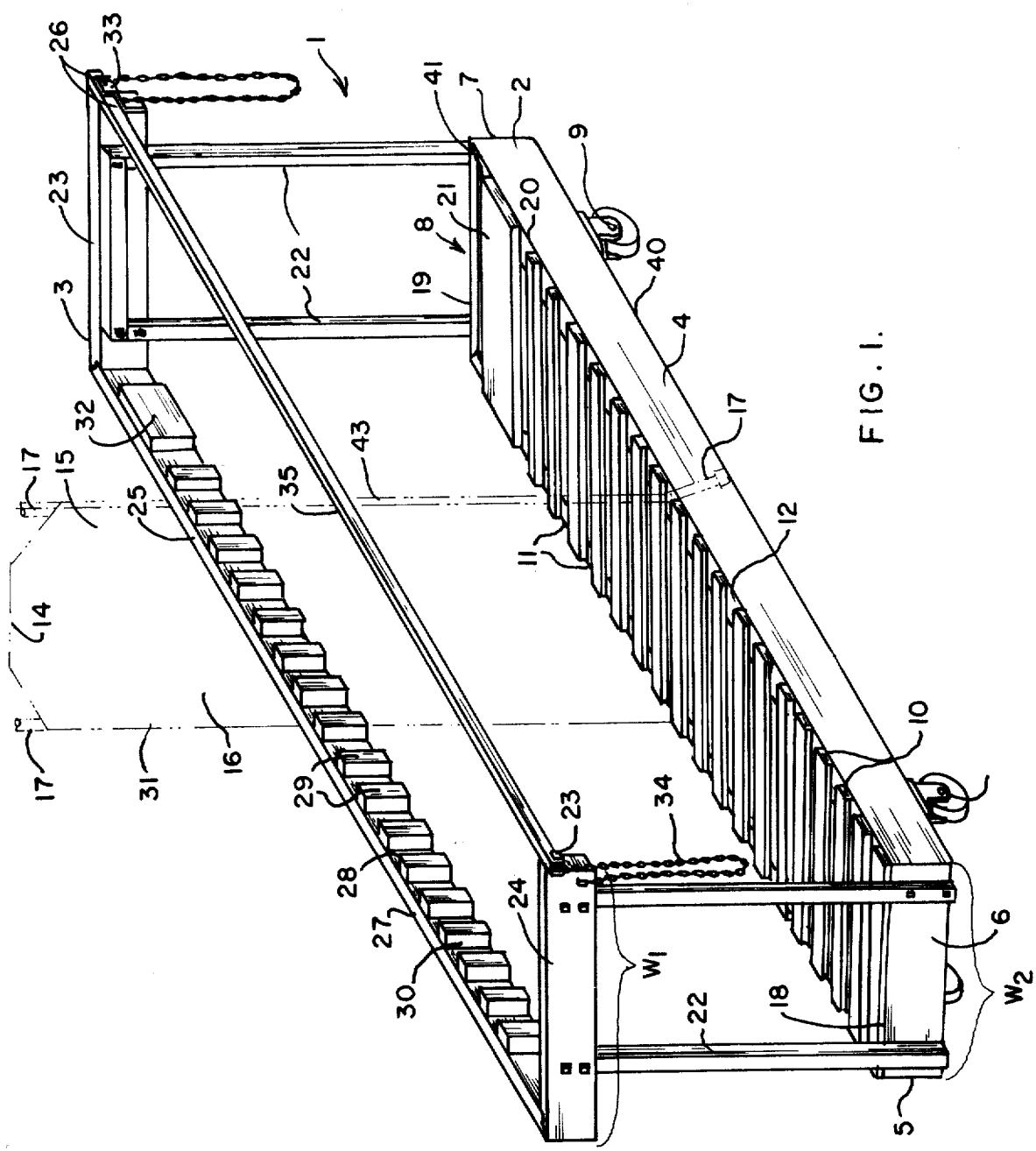
FIG. 1 is a view in perspective of cot storage cart of this invention.
Figure 2:
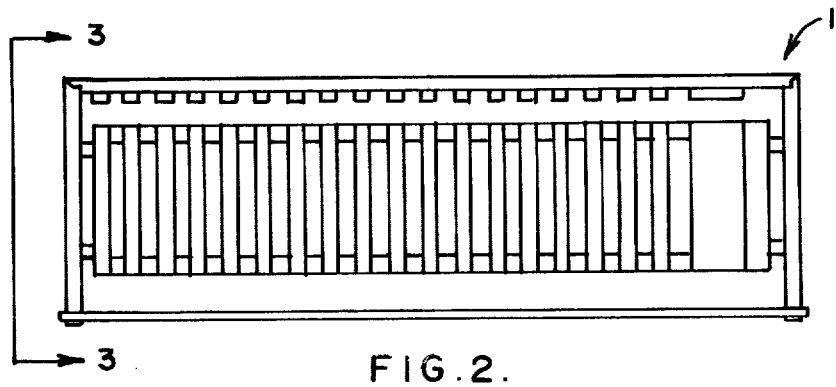
FIG. 2 is a top plan view of the device shown in FIG. 1.
Figure 3:
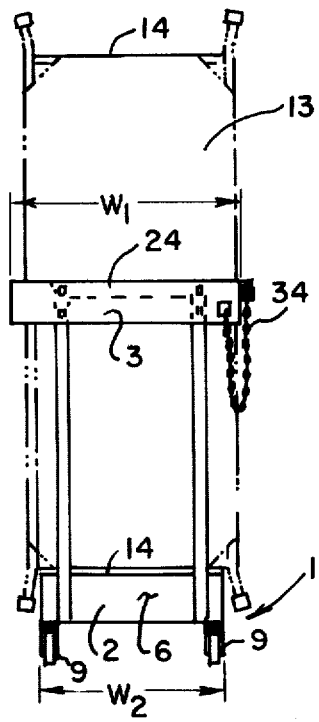
FIG. 3 is a view in end elevation, taken along the line 3—3 of FIG. 2.

Referring now to FIG. 1, reference numeral 1 indicates the cot storage cart of this invention. Cart 1 includes a base assembly 2 and an upper support assembly 3.

Base assembly 2 includes a pair of spaced side members 4 and 5 joined to a pair of end members 6 and 7 respectively. The side and end member pairs form a rectangular frame structure 8. A plurality of casters 9 are attached to the side members 4 and 5, preferably at the four corners of the frame structure 8, along an underside of the frame structure 8. The casters 9 are conventional and may comprise any of a variety of commercially available caster assemblies.

A plurality of spacers 10 extend between the side members 4 and 5, along an upperside 41 of the frame structure 8. The side members 4 and 5 and the spacers 10 delimit a surface 11 for the cart 1. A plurality of grooves 12 are defined by adjacent spacers 10. Each of the grooves 12 are open bottomed between the side members 4 and 5 and each is designed to receive an end 14 of a sleeping cot 13.

The sleeping cots 13 are conventional and include a rectangular frame 15 having sides 43 joined to the ends 14. A covering 16 extends across the frame and is attached along the ends 14 and sides 43. The frame is supported by four legs 17. The legs 17 extend outwardly from the frame 15. The legs 17 may be integrally constructed with the frame 15 or they may be constructed and attached to the frame 15 by any convenient method. The construction of the cot 13, and in particular the relationship of the legs 17 to the frame 15, make the cots difficult to store.

The cart 1 has a first end 18 and a second end 19. The spacers 10 are evenly distributed from the end 18 to a point short of the end 19 of the cart 1. The stopping point for the spacers 10 is determined by the number of the cots 13 carried by a particular cart 1 design. The distance along the side members 4 and 5 between the last spacer 10 and the end 19 is substantially closed by a stop means 21. Stop means 21 delimits one side of the last groove 12, thereby providing support for the end 14 of the last cot placed in the cart 1. Most important, stop means 21 permits easy removal of the cots 13 from the cart 1. That is, the cot's construction discussed above necessitates some free end movement if they are to be removed from the cart 1 without interferring with one another. The cots 13 are loaded in the cart 1 commencing from the end 18 side thereof. Loading is continued toward the end 19 of the cart 1 until the final cot carried by the cart 1 is in position. The spacers 10 keep adjacent ones of the cots 13 separated. The stop means 21 permits sequential cot 13 removal without interference.

Each of the end members 6 and 7 has a pair of upwardly extending vertical supports 22 attached to it. The supports 22 extend upwardly from the base assembly 2. The supports 22 are attached to the base assembly 2 at a first end, and are attached to the upper support assembly 3 at a second end. The supports 22 may comprise any of a variety of conventional structural members. Metal posts work well, although wood posts may be used in other embodiments of this invention.

Upper support assembly 3 includes a pair of end parts 23 and 24, a horizontal member 25 and a locking means 26.

The end parts 23 and 24 are attached to a second end of the supports 22. One end termination of the end parts 23 and 24 has lock means 26 attached to it, and the other end termination of the end parts 23 and 24 has the horizontal member 25 extending from and between them. The horizontal member 25 may be attached to the end parts 23 and 24 by any convenient method.

Horizontal member 25, as indicated above, is one of the main support members for the cots 13. The member 25 has an outer face 27 and an inner face 28. The face 28 has a plurality of horizontal spacers 29 attached to it, by any convenient method. Conventional threaded fasteners or epoxy adhesive work well. The horizontal spacers define a plurality of grooves 30 between adjacent ones of the spacers 29. Individual ones of the grooves 30 and 12 are aligned with one another, so that each of the cots 13 is supported both along one end part 14 and one of the sides 43 of the frame 15 by the grooves 12 and 30 respectively. The horizontal member 25 also includes a stop means 32 aligned with the stop means 21 of the base assembly 2. The stop means 32 has a function and structure similar to the stop means 21 described above.

Locking means 26 includes a clasp 33 attached to respective ends of the end parts 23 and 24. A removably mounted bar 35 is supported by the clasp 33. Each end of the bar 35 has a restraining chain 34 attached to it. A second end of the chain 34 is attached to respective ones of the end parts 23 and 24.

It is important to note that the end parts 23 and 24 have a first width, denominated herein as $W_1$, and that the end members 5 and 6 have a second width, denominated $W_2$. The width $W_1$ is larger than the width $W_2$. The width $W_2$ is chosen so that the legs 17 of the cot 13 extend outboard of the side members 4 and 5 of base assembly 2 when the cot 13 is placed in the cart 1. The width $W_2$ is chosen so that the sides 43 of the cot 13 enter the grooves 30 of the horizontal member 25 on one side and abut the bar 35 when the bar 35 is placed in the clasp 33 in the loaded condition of the cart 1.

Use of the cart 1 of this invention is both simple and convenient. As indicated above, the cots 13 are inserted in the cart 1 from the end 18 toward the end 19 of the base assembly 2. Each individual cot is inserted within respective ones of the aligned grooves 30 and 12. When the last cot 13 is placed in the cart 1, the bar 35 is inserted within the clasp 33 to securely lock the cot plurality within the cart 1. The chain 34 may be of a variety of lengths. It is convenient if the chain 34 permits the bar 35 to hang freely below the side member 4 but above the floor or other supporting surface on which the cart 1 rests. This length permits easy removal of the cots 13. With the bar 35 in place, the cart 1 may be maneuvered easily by hand. Because of the use of spacers 10 and 29, each cot 13 is maintained a discrete distance from any adjacent cot 13. The cart 1 merely may be maneuvered to a cleansing station and subjected to a wash down or other cleansing procedure. The cots 13 need not be removed from the cart 1 during cleansing. Thereafter, the cots may be left within the cart 1 for drying. The open bottom grooves 12 permit complete draining of the covering 16.

The unloading procedure of the cart 1 merely is the reversal of the loading order. The stop means 21 and 32 facilitate removal of the cots 13 in that an individual cot must be lifted slightly to clear the grooves 12 and then moved toward the end 19 and out the side of the cart 1 normally closed by the bar 35. The remaining cots 13 are cleared in the same order, as needed. I find it convenient to keep the loaded cart 1 in a first area when the cots 13 are not required for use, and thereafter to move the cart 1 to their area of use. Consequently, a single room of a day care center, for example, may serve as a general purpose room useful for both general activities and for a rest period.

Numerous variations, within the scope of the appended claims, will occur to those skilled in the art in light of the foregoing description and accompanying drawings. Thus, the supports 22 may comprise a single support, rather than the pair of supports shown and described. The design of the lock means 26 may be varied. For example, the lock means 26 may comprise a latch and hasp mechanism rather than the clasp described. Various materials may be used for the structural members of the cart 1. Likewise, the silhouette of the cart 1 may be changed in other embodiments of this invention. While the grooves 12 were described as open bottomed, the grooves may be closed bottomed in other embodiments of this invention. The draining feature of the embodiment described may be accomplished by providing a gradient to the bottom of the grooves or merely by providing one or more openings along the groove bottom. These variations are merely illustrative.

Having thus described the invention, what is claimed and desired to be secured by Letters Patent is:

1. A cot storage cart for storing a plurality of sleeping cots, comprising:

a base assembly, said base assembly including a supporting area having a first end and a second end, said supporting area having a plurality of spacers attached thereto, adjacent spacers defining a plurality of grooves, said base assembly having means for permitting removal of said cots, said cot removal permitting means being formed along one of said first and said second ends of said base assembly, said base assembly having a length dimension and width dimension;

support means attached to said base assembly and extending upwardly therefrom; and an upper support assembly including a pair of end pieces extending outboardly of the width dimension of said base assembly, and a horizontal member extending between a first end of respective ones of each of said end pieces, said horizontal member having a plurality of notches formed in it, individual ones of said notch plurality of said horizontal member being aligned with individual ones of said groove plurality of said base assembly, and guard means removably mounted to said upper support assembly between a second end of respective ones of each of said end pieces.

2. The cot storage cart of claim 1 wherein said grooves are open bottomed.

3. The cot storage cart of claim 2 wherein said individual ones of said grooves and said notches are aligned with one another to define a pair of supports for said sleeping cots.

4. A cot storage cart for storing a plurality of sleeping cots, said sleeping cots including a frame having a first end and a second end, a pair of spaced legs extending outwardly from the frame along each of said first and said second ends, said frame further including a first outboard side and a second outboard side between said first and second ends, which comprises:

a base assembly, said base assembly including a supporting area, said supporting area having a length dimension, a width dimension, a first end and a second end, a plurality of spacers attached to said supporting area along said width dimension, adjacent spacers defining a plurality of grooves, said grooves being arranged to receive one of said first and said second ends of the cot frame of an individual one of said cot plurality, said width dimension of said supporting area being less than the distance between said spaced legs of said cot frame so as to permit said legs to lie outboard of said supporting area, said base assembly including means for permitting removal of said cot plurality, said removal permitting means being formed along said second end of said base assembly;

support means attached to said base assembly and extending upwardly therefrom; and an upper support assembly including a pair of end pieces extending outboard of the width dimension of said base assembly, and a horizontal member extending between a first end of each of said end pieces, said horizontal member having a plurality of notches formed in it, individual ones of said notches being aligned with respective ones of said grooves so as to permit the engagement by the notches of the frame of an individual one of said cot plurality between said first and said second ends of said cot frame on the first side of said frame, and guard means removably mounted to said upper support assembly between a second end of each of said end pieces, said guard means adapted to abut the cot frame of individual ones of said cot plurality between said first and said second ends of said cot frame on the second side of said frame.

5. The cot storage cart of claim 4 wherein said grooves are open bottomed.

6. A cot storage cart for storing a plurality of sleeping cots, said cots including a frame having a first end and a second end, a pair of spaced legs extending outwardly from said frame along each of said first and said second ends, said frame having a first side and a second side, each of said sides extending between said first and second ends, said cot storage cart comprising:

a base assembly, said base assembly including a supporting area having a length dimension, a width dimension, a first end and a second end, said supporting area having a plurality of spacers attached to it along said width dimension, adjacent spacers defining a plurality of grooves, each of said grooves being arranged to receive one of said first and said second ends of the cot frame of an individual one of said cot plurality, said width dimension of said supporting area being less the distance between said spaced legs of said cot frame so as to permit said legs to extend outboard of said supporting area, said base assembly including means for permitting removal of said cots, said removal permitting means being formed along said second end of said base assembly;

support means attached to said base assembly and extending upwardly therefrom; and an upper support assembly including a pair of end pieces extending outboard of the width dimension of said base assembly, said upper support assembly including a horizontal member extending between a first end of each of said end pieces, said horizontal member having a plurality of notches formed in it, individual ones of said notches being aligned with respective ones of said grooves so as to permit the engagement by said notches of the cot frame of an individual one of said cot plurality between said first and said second ends of said cot frame on the first side of said frame.

7. The cot storage cart of claim 6 wherein said upper support assembly is further characterized by guard means removably mounted to said upper support assembly between a second end of each of said end pieces, said guard means being adapted to abut the cot frame of individual ones of said cot plurality between said first and said second ends of said cot frame on the second side of said frame.

8. The cot storage cart of claim 7 wherein said cot removal permitting means comprises a stop, said stop forming a side of a last groove of said groove plurality, the portion of said supporting area outboard of said stop being free of said cot frame engaging grooves.

9. The cot storage cart of claim 8 wherein each of the grooves of said groove plurality are open bottomed.

* * * * *